Aug. 2, 1927.　　　　　　　　　　　　　　　　1,637,386
J. R. McCLAIN

SHELLAC VISCOSITY TESTER

Filed June 13, 1924

WITNESSES:
Fred C. Williams
W. C. Wheeler.

INVENTOR
John R. McClain
BY
Wesley G. Carr
ATTORNEY

Patented Aug. 2, 1927.

1,637,386

UNITED STATES PATENT OFFICE.

JOHN RUSSELL McCLAIN, OF WILKINSBURG, PENNSYLVANIA, ASSIGNOR TO WESTINGHOUSE ELECTRIC & MANUFACTURING COMPANY, A CORPORATION OF PENNSYLVANIA.

SHELLAC-VISCOSITY TESTER.

Application filed June 13, 1924. Serial No. 719,740.

My invention refers to testing apparatus and specifically to an apparatus for testing the physical properties of shellac and other fusible materials.

For the purpose of determining the suitability of such materials for industrial purposes, it is important to know their physical properties. One of the physical properties of shellac which is relied upon is its viscosity when in the fused condition, and the rate of flow of the melted material through an aperture or a restricted passage is a measure of this property. One of the difficulties in measuring the viscosity of molten shellac is that the viscosity of the material continually changes when the shellac is in the molten condition. Therefore, it is necessary to maintain all such variables as temperature and duration of heating as nearly constant as possible in order to eliminate errors.

One object of my invention is therefore, to provide an apparatus for determining the viscosity of materials, such as shellac, which are solid or highly viscous at ordinary temperatures.

Another object of my invention is to provide a viscosity testing apparatus in which the personal element shall be eliminated as nearly as possible.

Still another object of my invention is to provide a testing apparatus which shall be of simple construction.

My apparatus comprises a metal plate which is provided with a receptacle in which the material to be tested is fused and a narrow channel connected with the receptacle through which the fused material is caused to flow in order to determine the viscosity when the apparatus is tilted. Means are provided for uniformly heating the apparatus and for uniformly maintaining all conditions of testing.

Figure 1:
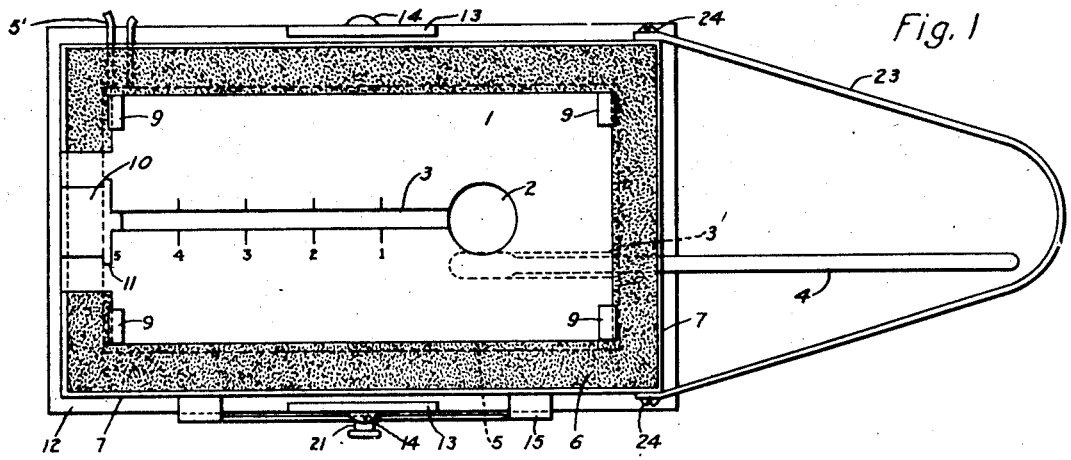
Figure 2:
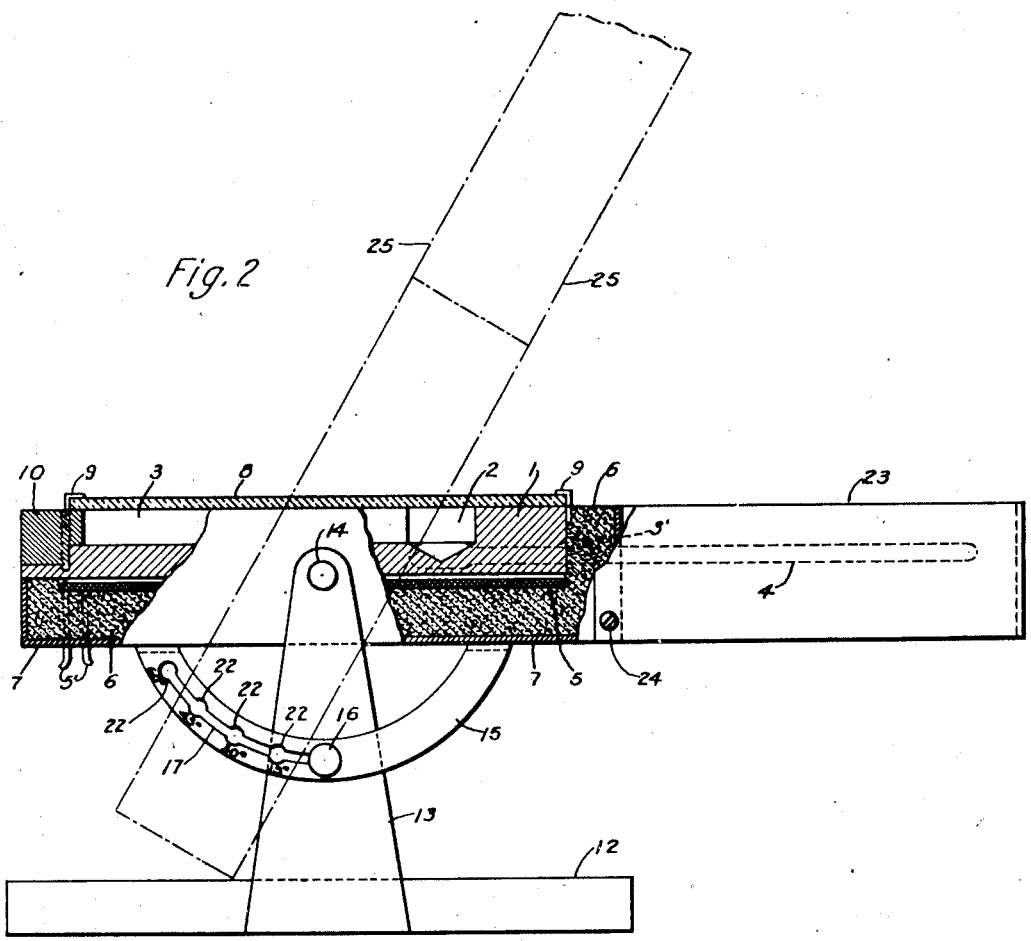
Figure 3:
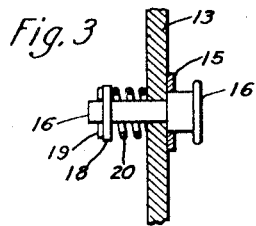

In the drawing constituting a part hereof and in which like numerals designate like parts, Figure 1 is a top plan view of my apparatus, Fig. 2 is a side elevational view of my apparatus partially in cross section, and Fig. 3 is a fragmentary cross-sectional view, partly in elevation, of the tilting and locking mechanism.

The apparatus comprises a rectangular metal plate 1 having a receptacle 2 formed therein near one end thereof and in which the shellac or other material to be tested is melted. A narrow slot or channel 3 of less depth than the receptacle 2 is cut in the plate and extends from the receptacle 2 to the edge of the plate. The side of the channel 3 is provided with a scale starting at the edge of the receptacle and extending along the channel and divided into suitable units of length, such as inches. An opening 3' terminating near the bottom wall of the receptacle 2 is bored in the end of the plate and a thermometer 4 is placed therein for determining the temperature of the receptacle. An electrical heating element 5 is provided underneath the plate 1 so that the heat is equally distributed throughout the plate and lead wires 5' are provided for the heating element at one end of the apparatus.

The plate 1 and the element 5 are embedded in a heat insulating cement 6, such as a mixture of mica dust and water glass, in such manner that only the top of the metal plate 1 is exposed. A metal box 7 contains the plate and insulating material. The top surface of the plate 1 is level with the top edges of the box 7 and a glass coverplate 8 is arranged to slide sidewise in brackets 9 which are attached to the metal plate 1. The glass plate 8 provides heat insulation for the top of the plate 1 and eliminates currents of air from the material when it is melted in the receptacle. A removable metal block 10 at the end of the plate and forming a closure for the channel is retained on the plate 1 by means of a tongue-and-groove 11 and prevents the circulation of cool air in the channel 3. The plate 8 overlaps the block 10 and thereby forms a tight joint that prevents a circulation of cool air into the channel.

The apparatus is supported on a base 12 to which are attached a pair of uprights 13 provided with a pair of pivots 14 so arranged that the apparatus may be tilted at any angle. A sector 15 is attached to the bottom of the box 7 and it co-operates with a pin 16 in uprights 13 for locking the apparatus in a desired tilted position. The pin 16 passes through a slot 17 in the sector 15 and is mounted on the upright 13 by means of a washer 18 and a cotter-pin 19. A coil spring 20 is interposed between the washer 18 and upright 13 so that the pin 16 may be drawn out of engagement with the circular openings 22 in the sector 15 whenever it is desired to tilt the apparatus. In tilting the apparatus, the pin 16 is disengaged from the opening 22 by drawing it outwardly against the spring 20 which allows the slot 17 to slide over the pin 16. When the apparatus is at the desired angle as for example 60°, the pin 16 is again returned to one of the circular openings 22. A guard and operating handle 23 is attached to the box 7 by means of bolts 24 and serves to protect the thermometer 4 from breakage and as an aid in tilting the apparatus.

In testing shellac, I assemble the apparatus with the glass top 8 and with the metal piece 10 in place, and I regulate the current in the heating element so that the temperature of the plate is maintained at exactly 125° C. A sample of two grams of powdered shellac, which has previously been ground to pass the fifty mesh screen and to be retained on a sixty mesh screen, is placed in the receptacle and the glass cover is replaced as quickly as possible. The sample is melted for exactly four minutes with the apparatus in a horizontal position and then the apparatus is tilted to an angle of 60° with the horizontal as shown in dotted lines 25. The melted shellac then flows into the channel 3 and the time it takes for the shellac to flow to the several divisions of the scale on the top of the metal plate is noted. This rate of flow is a measure of the viscosity of the molten shellac.

I have provided an apparatus for testing materials which are solid or highly viscous at ordinary temperatures. The apparatus is provided with a metal plate having a metal receptacle formed therein and a constricted channel for determining the rate of flow of the melted material when the apparatus is tilted at a predetermined angle. I provide means for maintaining predetermined temperature conditions in the apparatus, means for insulating the molten material from external conditions during the test, means for tilting and locking the apparatus in any desired position and means for determining the extent of flow of the material in any desired period of time.

Although I have described a specific embodiment of my invention I do not wish to be limited thereto. I have shown a preferred form of my invention but I may modify the shape and size of the receptacle and channel or I may use other methods of heating my apparatus such as steam or a heated liquid. Other modifications of my invention will suggest themselves to those skilled in the art without departing from the spirit of my invention, the scope of which is defined in the annexed claims.

I claim as my invention:

1. A testing apparatus for determining viscosity which comprises a plate provided with a receptacle in one portion thereof, said receptacle having an elongated channel communicating therewith, and a cover for retaining heat in said plate.

2. A testing apparatus for determining viscosity which comprises a plate provided with a receptacle in one portion thereof said receptacle having an elongated channel communicating therewith, a cover for retaining heat in said plate and insulating means for preventing a rapid flow of heat from the sides and bottom of said plate.

3. A testing apparatus for determining viscosity which comprises a supporting body, a plate in said body provided with a receptacle in one portion thereof and a channel communicating with said receptacle, said plate being provided with a scale adjacent to said channel for indicating distances from a predetermined point in said plate, a cover for said plate, means for insulating the sides and bottom of said body and means whereby said body may be tilted.

4. A testing apparatus for determining viscosity which comprises a plate provided with a circular receptacle therein and an elongated channel communicating with said receptacle, a body associated with said plate and including means for heating said plate, a removable heat insulating cover for said plate and insulating means on the sides and bottom of said body.

5. A testing apparatus for determining viscosity which comprises a plate provided with a circular receptacle therein and an elongated channel communicating with said receptacle, a body associated with said plate and including means for heating said plate, a removable heat insulating cover for said plate, a removable closure for the end of said channel remote from the receptacle, means whereby said body and plate may be tilted and insulating means on the sides and bottom of said body.

6. A testing apparatus comprising a metal body provided with a receptacle for heating the material to be tested and a channel of less depth than said receptacle and communicating therewith, means for predetermining the temperature conditions of said body and receptacle, means for maintaining said predetermined temperature condition and means for determining the extent of flow of material in said channel.

7. A testing apparatus comprising a metal body provided with a receptacle for containing the material to be tested while being heated and a channel of less depth than said receptacle and communicating therewith, means for predetermining the temperature conditions of said body, a glass cover for said body, insulation on the sides and bottom of said body, means for tilting said body, and means for determining the extent of flow of material in said channel when in a tilted position.

In testimony whereof, I have hereunto subscribed my name this 31st day of May, 1924.

JOHN RUSSELL McCLAIN.